(12) United States Patent
Doe et al.

(10) Patent No.: US 9,752,245 B2
(45) Date of Patent: Sep. 5, 2017

(54) NON-AQUEOUS ELECTROLYTE FOR RECHARGEABLE MAGNESIUM ION CELL

(71) Applicant: PELLION TECHNOLOGIES INC., Cambridge, MA (US)

(72) Inventors: Robert Ellis Doe, Norwood, MA (US); Ruoban Han, Somerville, MA (US); Yossef Gofer, Kochav-Yair (IL); Doron Aurbach, Bnei Brak (IL); Nir Pour, Lower Galilee (IL); Evgeny Sterenberg, Yavne (IL)

(73) Assignee: PELLION TECHNOLOGIES, INC., Woburn, MA (US)

( * ) Notice: Subject to any disclaimer, the term of this patent is extended or adjusted under 35 U.S.C. 154(b) by 783 days.

(21) Appl. No.: 14/309,132

(22) Filed: Jun. 19, 2014

(65) Prior Publication Data

US 2014/0302403 A1    Oct. 9, 2014

Related U.S. Application Data

(63) Continuation of application No. PCT/US2012/071350, filed on Dec. 21, 2012.
(Continued)

(51) Int. Cl.
*H01M 10/054* (2010.01)
*H01M 10/056* (2010.01)
(Continued)

(52) U.S. Cl.
CPC ............... *C25D 3/66* (2013.01); *C25D 3/42* (2013.01); *C25D 3/665* (2013.01);
(Continued)

(58) Field of Classification Search
CPC ........... H01M 10/054; H01M 10/0568; H01M 10/0569; H01M 2300/0025; H01M 4/466; C25D 3/66; C25D 3/42; Y02E 60/12
See application file for complete search history.

(56) References Cited

U.S. PATENT DOCUMENTS

| 4,948,770 A | 8/1990 | Job |
| 5,198,078 A | 3/1993 | Gale et al. |
| (Continued) | | |

FOREIGN PATENT DOCUMENTS

WO    2010144268 A1    12/2010

OTHER PUBLICATIONS

International Search Report issued by the USPTO as ISA for parent application PCT/US12/71350 dated Mar. 13, 2013.
(Continued)

*Primary Examiner* — Basia Ridley
*Assistant Examiner* — Heng Chan
(74) *Attorney, Agent, or Firm* — Milstein Zhang & Wu LLC; Joseph B. Milstein

(57) ABSTRACT

A non-aqueous Magnesium electrolyte comprising: (a) at least one organic solvent; (b) at least one electrolytically active, soluble, inorganic Magnesium (Mg) salt complex represented by the formula: $Mg_aZ_bX_c$ wherein a, b, and c are selected to maintain neutral charge of the molecule, and Z and X are selected such that Z and X form a Lewis Acid, and $1 \leq a \leq 10$, $1 \leq b \leq 5$, and $2 \leq c \leq 30$. Further Z is selected from a group consisting of aluminum, boron, phosphorus, titanium, iron, and antimony; X is selected from the group consisting of I, Br, Cl, F and mixtures thereof. Rechargeable, high energy density Magnesium cells containing an cathode, an Mg metal anode, and an electrolyte of the above-described type are also disclosed.

22 Claims, 5 Drawing Sheets

Related U.S. Application Data

(60) Provisional application No. 61/579,244, filed on Dec. 22, 2011.

(51) Int. Cl.
  *C25D 3/66* (2006.01)
  *H01M 10/0568* (2010.01)
  *H01M 10/0569* (2010.01)
  *C25D 3/42* (2006.01)
  *H01M 4/46* (2006.01)

(52) U.S. Cl.
  CPC ..... *H01M 10/054* (2013.01); *H01M 10/0568* (2013.01); *H01M 10/0569* (2013.01); *H01M 4/466* (2013.01); *H01M 2300/0025* (2013.01)

(56) References Cited

U.S. PATENT DOCUMENTS

| | | |
|---|---|---|
| 6,713,212 B2 | 3/2004 | Aurbach et al. |
| 2003/0059684 A1 | 3/2003 | Takami et al. |
| 2008/0182176 A1 | 7/2008 | Aurbach et al. |
| 2010/0136438 A1* | 6/2010 | Nakayama .......... H01M 10/054 429/339 |
| 2011/0159381 A1 | 6/2011 | Doe et al. |

OTHER PUBLICATIONS

Written Opinion issued by the USPTO as ISA for parent application PCT/US12/71350 dated Mar. 13, 2013.

\* cited by examiner

NON-AQUEOUS ELECTROLYTE FOR RECHARGEABLE MAGNESIUM ION CELL

RELATED APPLICATIONS

This application is a continuation under 35 U.S.C. 111(a) of co-pending International Application PCT/US12/71350, with an international filing date of Dec. 21, 2012, which application claims priority to U.S. Provisional Patent Application No. 61/579,244, filed on Dec. 22, 2011, each of which applications is hereby incorporated by reference in its entirety.

INCORPORATION BY REFERENCE

All non-patent literature, patents, patent applications and publications cited herein are hereby incorporated by reference in their entirety in order to more fully describe the state of the art as known to those skilled therein as of the date of the invention described herein.

FIELD OF INVENTION

The present invention relates to an electrolytic solution wherein Mg-ions are the charge carrier. The invention further relates to electrochemical cells utilizing this non-aqueous liquid electrolyte with a cathode and a magnesium-based anode.

BACKGROUND

A variety of rechargeable, high energy density electrochemical cells have been demonstrated although the most widely utilized commercial system is that based upon Li-ion chemistry because it displays very high energy density. Such cells usually consist of a transition metal oxide or chalcogenide cathode-active material, an anode-active lithium metal or lithium intercalation or alloy compound such as graphitic carbon, tin and silicon, and an electrolytic solution containing a dissolved lithium-based salt in an aprotic organic or inorganic solvent or polymer. Today there is great demand for energy storage devices capable of storing more Wh/l or Wh/kg than premier rechargeable Li-ion batteries are capable of delivering. Consequently an increasingly sought after route to meeting this demand higher energy density is to replace the monovalent cation lithium (Li+) with divalent magnesium cations ($Mg^{2+}$) because magnesium can enable nearly twice the charge of Li+ to be transferred, per weight or volume. Furthermore the abundance of Mg metal and readily available compounds containing Mg will enable significant cost reduction relative to Li-ion batteries, and it encompass superior safety and waste disposal characteristics.

Electrolytes utilizing alkali metal with organic ligands from organometallic species have been described; however the use of an alkaline earth metal anode such as magnesium would appear disadvantageous relative to the use of an alkali metal such as lithium because alkali metal anodes are much more readily ionized than are alkaline earth metal anodes. In addition, on recharge the cell must be capable of re-depositing the anode metal that was dissolved during discharge, in a relatively pure state, and without the formation of deposits on the electrodes. Furthermore, there are numerous other disadvantages to alkali batteries. Alkali metals, and lithium in particular, are expensive. Alkali metals are highly reactive. Alkali metals are also highly flammable, and fire due to the reaction of alkali metals with oxygen, water or other active materials is extremely difficult to extinguish. As a result, the use of alkali metals requires specialized facilities, such as dry rooms, specialized equipment and specialized procedures. In contrast, magnesium metal and its respective inorganic salts are easy to process and usually considered as benign. The metals are reactive, but undergo rapid passivation of the surface, such that the metals are highly stable. Magnesium is inexpensive relative to the alkali metals, and widely used as ubiquitous construction materials.

Electrolytes that enable reversible, electrochemical deposition of Mg and have potential use in a battery contain organometallic bonds. Most often these electrolytes contain organometallic Grignard salts as the electrochemically active component. However sustaining >1 volt is problematic or impossible with the usual intercalation cathodes because of electrolyte decomposition and corresponding encrustation/passivation of electrode surfaces. Enhanced electrochemical stability has been demonstrated by complexing with strong Lewis acids. For example, a cell comprised of a Magnesium metal anode, a Molybdenum Sulfide "Chevrel" phase active material cathode, and an electrolyte solution derived from an organometallic complex containing Mg is capable of the reversible, electrochemical plating of Magnesium metal from solutions with about a 2 V stability window. Under the same principle similar results have also been shown when you complex inorganic $MgCl_2$ and organometallic Aluminum Lewis Acids.

Such cells are low energy density due to a low voltage reaction between a Chevrel cathode and Mg metal anode and therefore not commercially viable. Sustaining a voltage >2 volts is problematic or impossible with the usual intercalation cathodes and electrolytes based upon Grignard and other organometallic species. Magnesium batteries operating at >1.5 volts are particularly prone to electrolyte decomposition and to encrustation/passivation of the electrode surface. Furthermore electrolytes targeted for use in electrochemical cells wherein the plating and stripping of Mg-ions is required specify organometallic species among the ionic species in the respective electrolytic solutions. There are many disadvantages to organometallic species, relative to inorganic salts. Practically, all organometallic species of the alkalis and the earth alkalis are highly unstable in the presence of air and water and thus classified as pyrophoric. Organometallic species are quite expensive to produce while maintaining purity. Organometallic species introduce organic ligands to the electrolytic solution, which inherently limits the electrochemical stability of the solution. Organometallic species introduce organic ligands to the electrolytic solution, which will limit the chemical stability of the solution when in contact with certain electrode active materials and other electrochemical cell components. All handling and manipulations of organometallic species of this sort are complicated, hazardous and expensive.

Consequently there is a widely recognized need for, and it would be highly advantageous to have, an improved non-aqueous electrolyte that allows the production of a practical, rechargeable magnesium battery which would be safer and cleaner, and more durable, efficient and economical than heretofore known.

SUMMARY

An electrolyte is provided, in which Mg-ions are the charge carriers. In some embodiments, the properties of the electrolyte include high conductivity and an electrochemical window that can exceed 3.0 V vs. $Mg/Mg^{+2}$. The use of the electrolyte promotes the deposition and intercalation of Mg without the use of any organometallic species.

In some aspects, a non-aqueous electrolyte for use in an electrochemical cell includes (a) at least one organic solvent; and (b) at least one soluble, inorganic Magnesium (Mg) salt complex represented by the formula: $Mg_aZ_bX_c$ wherein a, b, and c are selected to maintain neutral charge of the molecule, and Z and X are selected such that Z and X form a Lewis Acid; and $1 \leq a \leq 10$, $1 \leq b \leq 5$, and $2 \leq c \leq 30$. In some embodiments, Z is selected from a group consisting of aluminum, boron, phosphorus, titanium, iron, and antimony. In certain embodiments, X is selected from the group consisting of I, Br, Cl, F and mixtures thereof.

In another aspect, a non-aqueous electrolyte for use in an electrochemical cell includes (a) at least one organic solvent; (b) at least one soluble, inorganic Magnesium (Mg) salt complex represented by the formula: $Mg_nZX_{3+(2*n)}$, in which Z is selected from a group consisting of aluminum, boron, phosphorus, titanium, iron, and antimony; X is a halogen (I, Br, Cl, F or mixture thereof) and n=1–5.

As described herein, the Magnesium (Mg) salt complex is electrolytically active, i.e., ionically conductive with regards to Mg-ions.

According to further features in preferred embodiments described below, the electrolyte is incorporated into specific Mg-ion electrochemical cells including an appropriate anode-cathode pair. In one aspect, an appropriate anode-cathode pair is a magnesium metal anode and a magnesium insertion-compound cathode.

In some specific embodiments described herein, the Magnesium inorganic salt complex includes Magnesium Aluminum Chloride complex (MACC) formed from combinations of $MgCl_2+AlCl_3$ in ethereal solvents such as THF and Glyme. In some embodiments, the electrolyte described herein successfully addresses the shortcomings of the presently-known electrolytes and provides the basis for the production of a viable, rechargeable magnesium battery with a voltage exceeding a 2 Volt, or a 3 Volt stability window.

The significantly wider electrochemical window obtained using electrolytes described herein indicates improved stability for the electrolytic solution and allows the use of more energetic cathode materials, such that both the cycle life and the energy density of the battery are substantially increased. Furthermore, the present invention enables cheaper, safer, and more stable materials to be utilized for these purposes.

In one aspect, a non-aqueous electrolyte solution is described, including:

(a) at least one organic solvent; and (b) at least one electrolytically active, soluble, inorganic Magnesium (Mg) salt complex represented by the formula $Mg_aZ_bX_c$, and Z and X are selected such that Z and X form a Lewis Acid; and $1 \leq a \leq 10$, $1 \leq b \leq 5$, and $2 \leq c \leq 30$.

In any of the preceding embodiments, a, b, and c are selected to maintain neutral charge of the molecule.

In any of the preceding embodiments, Z is selected from a group consisting of aluminum, boron, phosphorus, titanium, iron, and antimony; and X is selected from the group consisting of I, Br, Cl, F and mixtures thereof.

In any of the preceding embodiments, $1 \leq a \leq 10$, $1 \leq b \leq 2$, and $3 \leq c \leq 30$.

In any of the preceding embodiments, the Magnesium (Mg) salt complex is represented by formula $Mg_nZX_{3+(2*n)}$, and n is from 1 to 5.

In any of the preceding embodiments, the Mg:Z ratio is greater than 1:2.

In another aspect, a non-aqueous Magnesium electrolyte solution is described, including a mixture of Magnesium halide and a compound more Lewis-acidic than the Magnesium halide in at least one organic solvent.

In any of the preceding embodiments, the compound is a Lewis acid.

In any of the preceding embodiments, the molar ratio of Magnesium halide to the compound is greater than 1.

In any of the preceding embodiments, the compound is selected from the group consisting of $BI_3$, $BBr_3$, $BCl_3$, $BF_3$, $AlI_3$, $AlBr_3$, $AlCl_3$, $AlF_3$, $PI_3$, $PBr_3$, $PCl_3$, $PF_3$, $BI_3$, $TiI_4$, $TiBr_4$, $TiCl_3$, $TiCl_4$, $TiF_3$, $TiF_4$, $FeI_2$, $FeBr_3$, $FeBr_2$, $FeCl_3$, $FeCl_2$, $FeF_3$, $FeF_2$, $SbI_3SbBr_3$, $SbCl_3$, $SbF_3$.

In any of the preceding embodiments, the magnesium halide includes magnesium chloride.

In any of the preceding embodiments, the magnesium chloride complex includes a reaction product of $MgCl_2$ and $AlCl_3$.

In any of the preceding embodiments, the Mg:Al ratio is in the range of greater than 0.5.

In any of the preceding embodiments, the Mg molarity in the electrolyte solution is at least 0.1 M.

In any of the preceding embodiments, the organic solvent is one or more solvent selected from the group consisting of ethers, organic carbonates, lactones, ketones, nitriles, ionic liquids, aliphatic and aromatic hydrocarbon solvents and organic nitro solvents.

In any of the preceding embodiments, the organic solvent is one or more solvent selected from the group consisting of THF, 2-methyl THF, dimethoxyethane, diglyme, ethyl diglyme, butyl diglyme, triglyme, tetraglyme, diethoxyethane, diethylether, proglyme, dimethylsulfoxide, dimethylsulfite, sulfolane, acetonitrile, hexane, toluene, nitromethane, 1-3 dioxalane, 1-4 dioxane, trimethyl phosphate, tri-ethyl phosphate, hexa-methyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), 1-(methoxyethyl)-1-methylpiperidinium-bis(trifluoromethylsulfonyl)imide (MOEMPP-TFSI), and ionic liquids.

In any of the preceding embodiments, the non-aqueous electrolyte solution is for use in a Magnesium electrochemical cell.

In any of the preceding embodiments, the non-aqueous electrolyte solution is for use in a Magnesium plating bath.

In yet another aspect, a method of preparing a non-aqueous electrolyte solution of any of the preceding embodiments is described, including: combining a source of magnesium, and a source of a metal Z, in an electrolyte solvent.

In yet another aspect, an electrochemical cell is described, including: a non-aqueous electrolyte solution according to one of the preceding embodiments; a magnesium-containing anode and a cathode capable of reversible electrochemical reaction with Magnesium.

In any of the preceding embodiments, the magnesium anode is select from the group consisting of Mg, Mg alloys, electrodeposited Mg, AZ31, AZ61, AZ63, AZ80, AZ81, AZ91, AM50, AM60, Elektron 675, ZK51, ZK60, ZK61, ZC63, M1A, ZC71, Elektron 21, Elektron 675, Elektron, Magnox, or insertion materials such as Anatase $TiO2$, rutile $TiO2$, $Mo_6S_8$, $FeS_2$, $TiS_2$, $MoS_2$.

In any of the preceding embodiments, the cathode is selected from the group consisting of Chevrel phase $Mo_6S_8$, $MnO_2$, CuS, $Cu_2S$, $Ag_2S$, $CrS_2$, $VOPO_4$, layered structure compounds such as $TiS_2$, $V_2O_5$, $MgVO_3$, $MoS_2$, $MgV_2O_5$, $MoO_3$, Spinel structured compounds such as $CuCr_2S_4$, $MgCr_2S_4$, $MgMn_2O_4$, $MgNiMnO_4$, $Mg_2MnO_4$, NASICON structured compounds such as $MgFe_2(PO_4)_3$ and $MgV_2(PO_4)_3$, Olivine structured compounds such as $MgMnSiO_4$ and $MgFe_2(PO_4)_2$, Tavorite structured compounds such as $Mg_{0.5}VPO_4F$, pyrophosphates such as $TiP_2O_7$ and $VP_2O_7$, and fluorides such as $MgMnF_4$ and $FeF_3$.

BRIEF DESCRIPTION OF THE DRAWINGS

The invention is herein described for purposes of illustration and by way of example only with reference to the accompanying drawings. The principles and operation of an electrolytic cell with an improved electrolyte according to the present invention may be better understood with reference to the drawings and the accompanying description.

DETAILED DESCRIPTION

Figure 1:
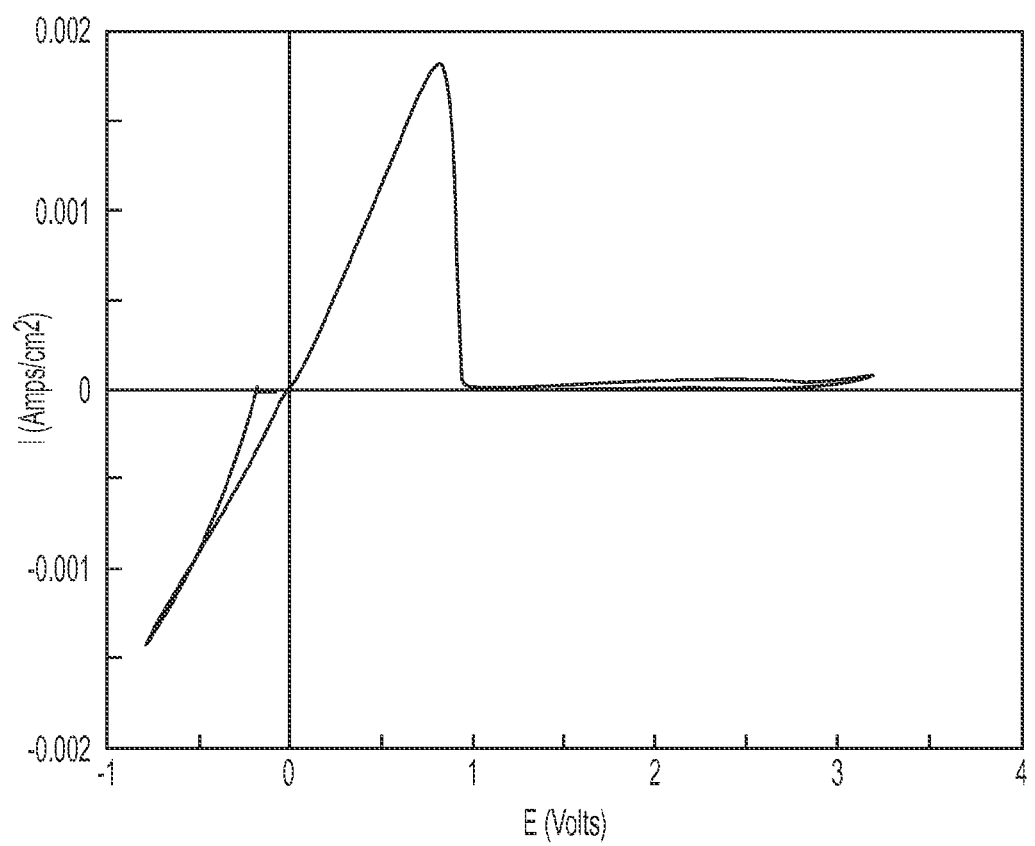
FIG. 1 is a graph displaying a typical cyclic voltammogram of the all-inorganic Magnesium Aluminum Chloride complex dissolved in tetrahydrofuran (THF). The experiment utilized 25 mV/s scan rate and a platinum working electrode, and Mg for the counter and reference electrodes.

An electrolyte is described herein for transferring Mg-ions between electrodes. The properties of the electrolyte include high conductivity and an electrochemical window that can exceed 3.0 V vs. $Mg/Mg^{2+}$. The use of an inorganic salt complex in an electrolyte promotes the substantially-reversible deposition of magnesium metal on the anode current collector and the reversible intercalation of magnesium in the cathode material.

In some embodiments, the electrolyte is for use in electrochemical cells, e.g., a magnesium electrochemical cell. In other embodiments, the electrolyte can be used in Magnesium plating baths, where electrochemical deposits of high purity Mg, or Mg-containing materials are prepared upon electronically conductive substrates. In such systems the electrolyte enables transfer of Mg ions from an Mg source being oxidized, e.g., low purity Magnesium electrode, to a cathode wherein the Mg ions are reduced onto an electronically conducting substrate, so as to create an Mg containing surface layer, which may be further processed.

In one aspect, a non-aqueous Magnesium electrolyte solution is described, including a mixture of Magnesium halide and a Lewis Acid in at least one organic solvent. The molar ratio of Magnesium halide to Lewis Acid can be 1, greater than 1, or less than 1. In some embodiments, the molar ratio of Magnesium halide to Lewis Acid is greater than 1, and the mixture is referred to as a "basic" mixture. In other embodiments, the molar ratio of Magnesium halide to Lewis Acid is less than 1, and the mixture is referred to as an "acidic" mixture.

In some embodiments, the non-aqueous electrolyte solution contains the active cation for the electrochemical cell, e.g., magnesium ion. The non-aqueous electrolyte solution can include a magnesium inorganic salt complex, which may be a reaction product of magnesium halide and a compound more Lewis acidic than the magnesium halide. In some embodiments, the compound is a Lewis acid. The non-aqueous electrolyte solution can include a mixture of a magnesium halide and a Lewis acid. The mixture can be a magnesium halide-Lewis acid complex, so as to form an Mg-halide species, which may can a monovalent charge in solution, or involve multiple Mg and halide species.

The term "Lewis Acid," is well-known in the art and may include any compound generally considered as a Lewis acid or a compound which is more Lewis-acidic than the magnesium halide. In certain embodiments, $MgCl_2$, can be used as Lewis acid due to its stronger Lewis-acidity in comparison with certain magnesium halides.

In one aspect, a non-aqueous electrolyte for use in an electrochemical cell includes (a) at least one organic solvent; and (b) at least one electrolytically active, soluble, inorganic Magnesium (Mg) salt complex represented by the formula: $Mg_aZ_bX_c$ wherein a, b, and c are selected to maintain neutral charge of the molecule, and Z and X are selected such that Z and X form a Lewis Acid; and $1 \leq a \leq 10$, $1 \leq b \leq 5$, and $2 \leq c \leq 30$. In some embodiments, Z is selected from a group consisting of aluminum, boron, phosphorus, titanium, iron, and antimony. In certain embodiments, X is selected from the group consisting of I, Br, Cl, F and mixtures thereof.

In certain embodiments, a can be in the range of: $1 \leq a \leq 10$, $1 \leq a \leq 5$, $1 \leq a \leq 4$, $1 \leq a \leq 3$, $1 \leq a \leq 2$, $1 \leq a \leq 1.5$, $2 \leq a \leq 10$, $2 \leq a \leq 5$, $2 \leq a \leq 4$, $2 \leq a \leq 3$, $2 \leq a \leq 2.5$, $3 \leq a \leq 10$, $3 \leq a \leq 5$, $4 \leq a \leq 10$, $4 \leq a \leq 5$, or $4.5 \leq a \leq 5$. In certain embodiments, b can be in the range of: $1 \leq b \leq 5$, $1 \leq b \leq 4$, $1 \leq b \leq 3$, $1 \leq b \leq 2$, $1 \leq b \leq 1.5$, $2 \leq b \leq 5$, $2 \leq b \leq 4$, $2 \leq b \leq 3$, $2 \leq b \leq 2.5$, $3 \leq b \leq 5$, $4 \leq b \leq 5$, or $4.5 \leq b \leq 5$. In certain embodiments, c can be in the range of: $2 \leq c \leq 30$, $3 \leq c \leq 30$, $4 \leq c \leq 30$, $5 \leq c \leq 30$, $10 \leq c \leq 30$, $15 \leq c \leq 30$, $20 \leq c \leq 30$, $25 \leq c \leq 30$, $2 \leq c \leq 25$, $3 \leq c \leq 25$, $4 \leq c \leq 25$, $5 \leq c \leq 25$, $10 \leq c \leq 25$, $15 \leq c \leq 25$, $20 \leq c \leq 25$, $2 \leq c \leq 20$, $3 \leq c \leq 20$, $4 \leq c \leq 20$, $5 \leq c \leq 20$, $10 \leq c \leq 20$, $15 \leq c \leq 20$, $2 \leq c \leq 15$, $3 \leq c \leq 15$, $4 \leq c \leq 15$, $5 \leq c \leq 15$, $10 \leq c \leq 15$, $2 \leq c \leq 10$, $3 \leq c \leq 10$, $4 \leq c \leq 10$, $5 \leq c \leq 10$, $2 \leq c \leq 5$, $3 \leq c \leq 5$, or $4 \leq c \leq 5$. In these embodiments, any range of a can be used in combination with any range of b and any range of c in the Mg salt complex described herein. Likewise, any range of b can be used in combination with any range of a and any range of c in the Mg salt complex described herein. Furthermore, any range of c can be used in combination with any range of a and any range of b in the Mg salt complex described herein.

In certain embodiments, the Mg salt complex is represented by formula $Mg_aZ_bX_c$ wherein $1 \leq a \leq 10$, $1 \leq b \leq 2$, and $3 \leq c \leq 30$.

In another aspect, a non-aqueous electrolyte for use in an electrochemical cell includes (a) at least one organic solvent; and (b) at least one electrolytically active, soluble, inorganic Magnesium (Mg) salt complex represented by the formula: $Mg_nZX_{3+(2*n)}$, in which Z is selected from a group consisting of aluminum, boron, phosphorus, titanium, iron, and antimony; X is a halogen (I, Br, Cl, F or mixture thereof) and n=1–5. The ratio of Mg to Z can vary from 1:2 to 5:1. In certain embodiments, the ratio of Mg to Z is 5:1, 4:1, 3:1, 2:1, 1:1, or 1:2; however, any non-whole number ratio may also be used. In certain embodiments, the ratio of Mg to Z is from 1:2 to 4:1, from 1:2 to 3:1, from 1:2 to 2:1, from 1:2 to 1:1, from 1:1 to 5:1, from 1:1 to 4:1, from 1:1 to 3:1, from 1:1 to 2:1, from 1:1 to 1.5, from 2:1 to 5:1, from 2:1 to 4:1, from 2:1 to 3:1, from 3:1 to 5:1, from 3:1 to 4:1, or from 4:1 to 5:1.

The electrolyte salt complex can be used at any concentration. In certain embodiments, the Mg concentration in molarity ranges up to 1M or 2 M. In one or more embodiments, the electrolyte salt complex has a Mg concentration in molarity of about 0.25 to about 0.5 M. In one or more embodiments, the electrolyte salt complex has a Mg concentration in molarity of at least about 0.1, 0.25, 0.5, 1.0, 1.5, or 2 M.

In some embodiments, n is greater than 0. In some embodiments, n is greater than 0.5. In some embodiments, n is 0.5, 0.6, 0.8, 1, 1.5, 2, 2.5, 3, 3.5, 4, 4.5, 5, 5.5, or 6.

Previously, the only electrolyte solutions proven to reversibly electrodeposit Mg metal at or near room temperature required a Grignard reagent, or another organometallic reagent with metal-organic bonds. However, the organometallic compounds, and complexes thereof, do not provide operating stability at voltages greater than 2 V. It has been surprisingly discovered that the non-aqueous electrolyte as disclosed herein provides operating stability at voltages greater than 2 V. According to one or more embodiments, the non-aqueous electrolyte as disclosed herein is capable of higher voltage stability while maintaining the ability to electrochemically deposit and strip Mg-ions in facile, reversible manner with low overpotential.

While not being bound by any particular mode of operation, it is hypothesized that the capability for reversible Mg deposition is accomplished via the formation of Magnesium halide salt cations, e.g., $MgCl^+$ and/or $Mg_2Cl_3^+$ species in solution. It is suggested that these species undergo two-electron reduction of $Mg^{2+}$ to $Mg^0$ while avoiding reduction of the anion by reactions similar to the following:

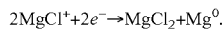

$$2MgCl^+ + 2e^- \rightarrow MgCl_2 + Mg^0.$$

Cationic species using other halides, such as $MgF^+$ and/or $Mg_2F_3^+$ species may also be suitable for reversible Mg deposition.

A suitable anion is used to maintain charge balance, enable complex formation, solubility in organic solvents, and ionic dissociation. In one preferred embodiment, this is demonstrated by a strong Lewis Acid such as $AlCl_3$ reacting with Lewis Basic $MgCl_2$, which drives the following example reaction:

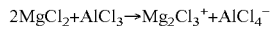

$$2MgCl_2 + AlCl_3 \rightarrow Mg_2Cl_3^+ + AlCl_4^-$$

The product can be described as $Mg_2AlCl_7$ salt or more generally as a Magnesium-Halide Complex or more specifically as a Magnesium-Aluminum Chloride Complex (MACC) solution. The product of this reaction enables reversible, facile electrochemical plating and stripping of Mg-ions onto an electrode without the use of organometallic reagents for the first time.

The non-aqueous electrolyte solution including MACC can employ $MgCl_2$ and $AlCl_3$ over a range of proportions to provide a range of Mg:Al ratios. In certain embodiments, the Mg:Al ratio is in the range of 1:1 to 5:1 with preferable being 4:1, 3:1, 2:1 or any ratio between. For example, any non-whole number ratio may also be used.

Although $MgCl_2$ is generally regarded as insoluble or poorly soluble in many organic solvents, it has been surprisingly demonstrated that non-aqueous electrolyte solutions including magnesium chloride complexes and in particular using MACC are possible, wherein the Mg molarity, e.g., concentration, ranging up to 1 M or 2 M, and for example at about 0.25 to about 0.5 M for Mg.

Other Lewis acids may be used; in preferred embodiments the Lewis acid meets the requirements of electrochemical stability throughout the window of cell operation. Such Lewis acids can be inorganic, that is, they do not contain any metal-organic bonds. Exemplary Lewis acids include $AlCl_3$, $AlBr_3$, $AlF_3$, $AlI_3$, $PCl_3$, $PF_3$, $PBr_3$, $PI_3$, $BCl_3$, $BF_3$, $BBr_3$, $BI_3$, $SbCl_3$, $SbF_3$, $SbBr_3$, $SbI_3$.

A variety of organic solvents are suitable for use in the electrolyte of the present invention. Suitable solvent(s) provide appreciable solubility to the Mg salt complex. Further, suitable solvent(s) do not electrochemically oxidize prior to the salt complex, or reduce above the Mg plating potential. Exemplary solvents include ethers, organic carbonates, lactones, ketones, nitriles, ionic liquids, aliphatic and aromatic hydrocarbon solvents and organic nitro solvents. More specifically, suitable solvents include THF, 2-methyl THF, dimethoxyethane, diglyme, ethyl diglyme, butyl diglyme triglyme, tetraglyme, diethoxyethane, diethylether, proglyme, dimethylsulfoxide, dimethylsulfite, sulfolane, acetonitrile, hexane, toluene, nitromethane, 1-3 dioxalane, 1-4 dioxane, trimethyl phosphate, tri-ethyl phosphate, hexamethyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), and 1-(methoxyethyl)-1-methylpiperidinium-bis(trifluoromethylsulfonyl) imide (MOEMPP-TFSI), ionic liquids, or combinations of any or all solvents listed with each other or a solvent not listed.

In one or more embodiments, the solvent is THF or dimethoxyethane for a solution containing the reaction product(s) of $MgCl_2$ and $AlCl_3$; the electrolyte assists in the reversible, electrochemical deposition and stripping of Mg when used in an electrochemical cell or plating bath.

While the concept of the above reaction results from effort to surpass the high voltage limitations of all previous organometallic-based electrolytic solutions, it is surprising to someone with expertise in the field that the invention described herein works for at least the following reasons:

1) The only electrolyte solutions proven to reversibly electrodeposit Mg metal at or near room temperature required the utilization of Grignard reagent, or another organometallic reagent with metal-organic bonds. Previously, no entirely inorganic salt solutions had ever shown such behavior;
2) The low solubility of $MgCl_2$ in various solvents steered others to conclude co-dissolution and reaction was not favorable, or even possible;
3) $MgCl_2$ is a chemically inert inorganic magnesium salt. It does not dissociate in solutions based on aprotic organic solvents to appreciable extent and displays little to no conductivity in solution. Furthermore, $MgCl_2$ alone is electrochemically inactive in such solutions, enabling no Mg deposition, dissolution or intercalation.

The magnesium electrolyte salt can be prepared by combining a source of magnesium, e.g., a magnesium halide, and a source of Z, e.g., a halide based on the metal Z in the electrolyte solvent with stirring and heating. Exemplary reaction times include 1, 5, 10, 12, 24, and 48 hours; exemplary reaction temperatures include greater than or equal to 20 degrees Celsius. Heating under inert atmosphere is preferred to avoid water contamination and formation of oxide species.

In some embodiments, it is preferable to condition the solution prior to use in an electrochemical cell, by elimination or mitigation of harmful species inevitably found in the raw materials and/or the as-prepared solution. In some embodiments, additives are provided in the electrolyte to mitigate the deleterious species, without the production of side reaction or unwanted, harmful chemicals. Water, oxygen, and peroxide(s) are non-limiting examples of deleterious species.

Conditioning is accomplished by control of variables including, but not limited to, Mg:Al ratio, constituent molarity, solvent choice, precursor and solvent purity, impurity removal, reaction temperature, time, mixing, and electrochemical conditions could yield the first solution containing an all inorganic salt capable of reversible deposition of Mg. The electrolyte can be conditioned using a variety of processes, including physical, chemical and electrochemical process. The process of conditioning includes the following non-limiting examples:

1) Using Al as an example for Z, physical processes that enable a high degree of Mg complex formation and removal of deleterious species/impurities including: heating, freezing, distillation, maintaining an Mg:Al ratio between 1:1 and 5:1, maintaining molarities that saturate the solution, etc. In some embodiments, the electrolyte solution is heated to help the dissolution of the Mg salt and the Lewis acids. In some embodiments, the Mg:Al ratio is adjusted so that a saturated electrolyte solution with high concentration of the electrolytically active Mg salt complex is obtained. In some specific embodiments, the Mg:Al ratio is 1:1, 2:1, 3:1, 4:1, or 5:1. Similarly, in the case where Z is a metal other than Al, the Mg:Z ratio can be adjusted to result in a high concentration of electrolytically active Mg salt complex. Non-limiting examples of the Mg:Z ratios include those between 0.5:1 and 5:1;

2) Chemical processes in order to remove deleterious species such as addition of minute quantities of proton/water scavengers, such as Grignard's, organoaluminum, molecular sieves, gamma-alumina, silica, Magnesium metal, etc.;

3) Electrochemical processes like potentiostatic, potentiodynamic or galvanostatic electrolysis that enable a high degree of Mg complex formation and removal of deleterious species/impurities. This can be accomplished at reducing or oxidizing potentials, which reduce or oxidize deleterious species and/or drive the reaction of reactants to products. It can be exercised with inert electrodes, sacrificial electrodes, like Mg or, within a complete cell, with an auxiliary electrode or with the cathode serving as the working electrode. In some specific embodiments, the electrolyte is subjected to multiple cycles of potentiostatic, potentiodynamic or galvanostatic electrolysis. In some specific embodiments, the electrolyte is potentiostatically polarized for 5 cycles, 10 cycles, 15 cycles, 20 cycles, or 30 cycles.

In one or more embodiments, the electrolyte salt solution is conditioned to improve the electrochemical properties through electrochemical polarization.

In one or more embodiments, the electrolyte salt solution is conditioned to improve the electrochemical properties by reacting with insoluble active metals Mg, Al, Ca, Li, Na, K., and/or reacting with insoluble acids/bases, adsorbing agents such as molecular sieves, $CaH_2$, alumina, silica, $MgCO_3$, etc.

In one or more embodiments, the electrolyte salt solution is conditioned improve the electrochemical properties by providing additives to scavenge contaminants such as organo-Mg, organo-Al, organo-B, organometallics, trace water, oxygen and $CO_2$, and protic contaminants.

As described above, the electrochemical window of a cell with an electrolyte as described herein and an appropriate anode-cathode pair is 2.9-3.1 volts, such that the cell can be operated in a stable, reversible fashion at 2.0-2.6 volts without decomposition of the electrolyte.

In one or more embodiments, an electrochemical cell is provided including an electrolyte having at least one electrolytically active, soluble, inorganic Magnesium (Mg) salt complex represented by the formula $Mg_aZ_bX_c$ wherein a, b, and c are selected to maintain neutral charge of the molecule, and Z and X are selected such that Z and X form a Lewis Acid; and $1 \le a \le 10$, $1 \le b \le 10$, and $2 \le c \le 30$. The electrochemical cell includes a metal anode and an intercalation cathode.

In one or more embodiments, a battery includes the electrolyte according to the present invention, a magnesium metal anode and a magnesium insertion compound cathode.

In one or more embodiments, the magnesium insertion-compound cathode includes a magnesium-Chevrel intercalation cathode of the formula, $Mo_6S_8$.

The electrolyte composition of the present invention includes an organic solvent and electrochemically-active, soluble, inorganic salt of the formula $Mg_nZX_{3+(2*n)}$, in which Z is selected from a group consisting of aluminum, boron, phosphorus, titanium, iron, and antimony; X is a halogen (I, Br, Cl, F or mixture thereof) and n=1–5. Inorganic salts of this form may, in certain cases, be combined with compatible organometallic salts or with compatible inorganic salts of other forms.

Intercalation cathodes used in conjunction with the electrolyte according to the present invention preferably include transition metal oxides, transition metal oxo-anions, chalcogenides, and halogenides and combinations thereof. Non-limiting examples of positive electrode active material for the Mg battery include Chevrel phase $Mo_6S_8$, $MnO_2$, CuS, $Cu_2S$, $Ag_2S$, $CrS_2$, $VOPO_4$, layered structure compounds such as $TiS_2$, $V_2O_5$, $MgVO_3$, $MoS_2$, $MgV_2O_5$, $MoO_3$, Spinel structured compounds such as $CuCr_2S_4$, $MgCr_2S_4$, $MgMn_2O_4$, $MgNiMnO_4$, $Mg_2MnO_4$, NASICON structured compounds such as $MgFe_2(PO_4)_3$ and $MgV_2(PO_4)_3$, Olivine structured compounds such as $MgMnSiO_4$ and $MgFe_2(PO_4)_2$, Tavorite structured compounds such as $Mg_{0.5}VPO_4F$, pyrophosphates such as $TiP_2O_7$ and $VP_2O_7$, and fluorides such as $MgMnF_4$ and $FeF_3$.

In some embodiments, the positive electrode layer further includes an electronically conductive additive. Non-limiting examples of electronically conductive additives include carbon black, Super P, Super C65, Ensaco black, Ketjen black, acetylene black, synthetic graphite such as Timrex SFG –6, Timrex SFG –15, Timrex SFG –44, Timrex KS –6, Timrex KS –15, Timrex KS –44, natural flake graphite, carbon nanotubes, fullerenes, hard carbon, or mesocarbon microbeads.

In some embodiments, the positive electrode layer further includes a polymer binder. Non-limiting examples of polymer binders include poly-vinylidene fluoride (PVdF), poly (vinylidene fluoride-co-hexafluoropropene) (PVdF-HFP), Polytetrafluoroethylene (PTFE), Kynar Flex 2801, Kynar Powerflex LBG, and Kynar HSV 900, or Teflon.

Negative electrodes used in conjunction with the present invention comprise a negative electrode active material that can accept Mg-ions. Non-limiting examples of negative electrode active material for the Mg battery include Mg, common Mg alloys such as AZ31, AZ61, AZ63, AZ80, AZ81, AZ91, AM50, AM60, Elektron 675, ZK51, ZK60, ZK61, ZC63, M1A, ZC71, Elektron 21, Elektron 675, Elektron, Magnox, or insertion materials such as Anatase $TiO_2$, rutile $TiO_2$, $Mo_6S_8$, $FeS_2$, $TiS_2$, $MoS_2$.

In some embodiments, the negative electrode layer further comprises an electronically conductive additive. Non-limiting examples of electronically conductive additives include carbon black, Super P, Super C65, Ensaco black, Ketjen black, acetylene black, synthetic graphite such as Timrex SFG –6, Timrex SFG –15, Timrex SFG –44, Timrex KS –6, Timrex KS –15, Timrex KS –44, natural flake graphite, carbon nanotubes, fullerenes, hard carbon, or mesocarbon microbeads.

In some embodiments, the negative electrode layer further comprises a polymer binder. Non-limiting examples of polymer binders include poly-vinylidene fluoride (PVdF), poly(vinylidene fluoride-co-hexafluoropropene) (PVdF-HFP), Polytetrafluoroethylene (PTFE), Kynar Flex 2801, Kynar Powerflex LBG, and Kynar HSV 900, or Teflon.

In some embodiments, the Mg battery used in conjunction with the electrolyte described herein comprises a positive electrode current collector comprising carbonaceous material. In some embodiments, the Mg battery described herein comprises a negative electrode current collector comprising carbonaceous material. In other embodiments, the Mg battery described herein comprises positive and negative electrode current collectors comprising carbonaceous material.

In some embodiments, the Mg battery disclosed herein is a button or coin cell battery consisting of a stack of negative electrode, porous polypropylene or glass fiber separator, and positive electrode disks sit in a can base onto which the can lid is crimped. In other embodiments, the Mg battery used in conjunction with the electrolyte disclosed herein is a stacked cell battery. In other embodiments, the Mg battery disclosed herein is a prismatic, or pouch, cell consisting of one or more stacks of negative electrode, porous polypropylene or glass fiber separator, and positive electrode sandwiched between current collectors wherein one or both current collectors comprise carbonaceous materials. The stack(s) are folded within a polymer coated aluminum foil pouch, vacuum and heat dried, filled with electrolyte, and vacuum and heat sealed. In other embodiments, the Mg battery disclosed herein is a prismatic, or pouch, bi-cell consisting of one or more stacks of a positive electrode which is coated with active material on both sides and wrapped in porous polypropylene or glass fiber separator, and a negative electrode folded around the positive electrode wherein one or both current collectors comprise carbonaceous materials. The stack(s) are folded within a polymer coated aluminum foil pouch, dried under heat and/or vacuum, filled with electrolyte, and vacuum and heat sealed. In some embodiments of the prismatic or pouch cells used in conjunction with the electrolyte described herein, an additional tab composed of a metal foil or carbonaceous material of the same kind as current collectors described herein, is affixed to the current collector by laser or ultrasonic welding, adhesive, or mechanical contact, in order to connect the electrodes to the device outside the packaging.

In other embodiments, the Mg battery used in conjunction with the electrolyte disclosed herein is a wound or cylindrical cell consisting of wound layers of one or more stacks of a positive electrode which is coated with active material on one or both sides, sandwiched between layers of porous polypropylene or glass fiber separator, and a negative electrode wherein one or both current collectors comprise carbonaceous materials. The stack(s) are wound into cylindrical roll, inserted into the can, dried under heat and/or vacuum, filled with electrolyte, and vacuum and welded shut. In some embodiments of the cylindrical cells described herein, an additional tab composed of a metal foil or carbonaceous material of the same kind as current collectors described herein, is affixed to the current collector by laser or ultrasonic welding, adhesive, or mechanical contact, in order to connect the electrodes to the device outside the packaging.

The invention is illustrated by way of the following examples, which are presented by way of illustration only and are not intended to be limiting of the invention.

EXAMPLE 1

FIG. 1 is a graph displaying a typical cyclic voltammogram of the all-inorganic salt Magnesium Aluminum Chloride complex. Solutions utilize tetrahydrofuran (THF) as the solvent and Platinum as the working electrode while Magnesium serves as both the auxiliary and reference electrodes.

The data depicted in FIG. 1 shows the potentiodynamic behavior of $Mg_2AlCl_7$ complex inorganic salt obtained with THF solution from the reaction of $2MgCl_2+1AlCl_3$. The peak displaying maximum current density at –1 V is due to the deposition of magnesium metal while the peak with maximum current density at about 0.3 V is attributed to the subsequent electrochemical dissolution of the magnesium metal. The electrochemical window obtained with this system exceeds 3.1 V vs $Mg/Mg^{2+}$. It is clearly evident from the cyclic voltammogram that the process of magnesium deposition and dissolution is fully reversible.

Figure 2:
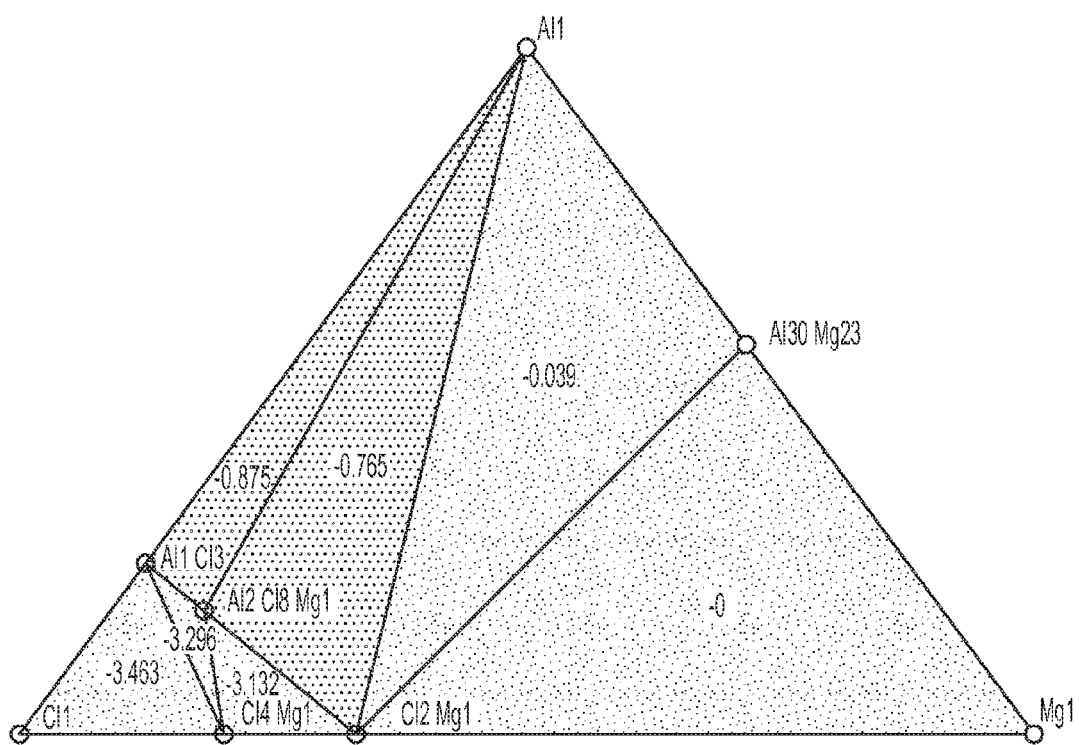
FIG. 2 depicts the Mg—Al—Cl ternary phase diagram derived from the ab initio calculated energies of compounds within that system. Each point represents a thermodynamically stable compound and the space within each triangular plane represents compositional space wherein a mixture of the 3 vertex compounds is thermodynamically stable to the voltage vs. $Mg/Mg^{2+}$ indicated within that triangle.

FIG. 2 depicts the Mg—Al—Cl ternary phase diagram derived from the ab initio calculated energies of compounds within that system. Each point in the diagram represents a thermodynamically stable compound (e.g., Mg, $MgCl_2$, $MgAl_2Cl_8$ etc.) and the space within each triangular plane represents compositional space wherein a mixture of the three vertex compounds is thermodynamically favored over a single ternary compound within that region up until the voltage vs. $Mg/Mg^{2+}$ indicated within that triangle. The phase diagram indicates that compounds existing along the tie line between $MgCl_2$ and $AlCl_3$, such as $MgAl_2Cl_8$, will oxidize when the voltage is >3.1-3.3 V vs. $Mg/Mg^{2+}$. This result corroborates the cyclic voltammogram depicted in FIG. 1, which suggests 3.1 V vs. $Mg/Mg^{2+}$ is the limit of oxidative stability for Magnesium Aluminum Chloride Complexes resulting from the reaction of $2MgCl_2+1AlCl_3$. Furthermore it is important to note $MgCl_2$ is in direct equilibrium with Mg metal because it can be a soluble species and will not disproportionate into undesirable products in the presence of Mg metal. Similar observations can be made for reaction of $MgCl_2$ with any of the following: $BCl_3$, $PCl_3$, $SbCl_3$, $PCl_3$.

EXAMPLE 2

In a typical preparation of an electrochemically active MACC solution such as 0.267 M $Mg_2AlCl_7$, one may undertake the following reaction:

$2MgCl_2+1AlCl_3 \rightarrow Mg_2AlCl_7$, by placing both ~0.508 g MgCl$_2$ powder (99.99%) and ~0.356 AlCl$_3$ (99.999%) into a single glass container with a stir bar under inert atmosphere. Thereafter add 20.0 ml of tetrahydrofuran (THF, anhydrous <20 ppm H$_2$O) and stir vigorously because the initial dissolution is exothermic in nature. Subsequently stir and heat to ≥30.0 degrees Celsius for minimum of one hour after which solution may be returned to room temperature. The resulting solution is clear to light yellow or brown color with no precipitation. In some embodiments it is preferable to let the final solution sit over Mg metal powder in order to condition the solution for improved electrochemical response by reducing residual water and other impurities.

In a typical preparation of an electrochemically active MACC solution such as 0.4 M MgAlCl$_5$, one may undertake the following reaction:

by placing both ~1.1424 g MgCl$_2$ powder (99.99%) and ~1.6002 AlCl$_3$ (99.999%) into a single glass container with a stir bar under inert atmosphere. Thereafter add 30.0 ml of 1,2-dimethoxymethane (DME, anhydrous <20 ppm H$_2$O) and stir vigorously because the initial dissolution is exothermic in nature. Subsequently stir and heat to ≥70.0 degrees Celsius for minimum of several hours after which solution may be returned to room temperature. The resulting solution is clear with no precipitation. In some embodiments it is preferable to let the final solution sit over Mg metal powder in order to condition the solution for improved electrochemical response by reducing residual water and other impurities.

Figure 3:
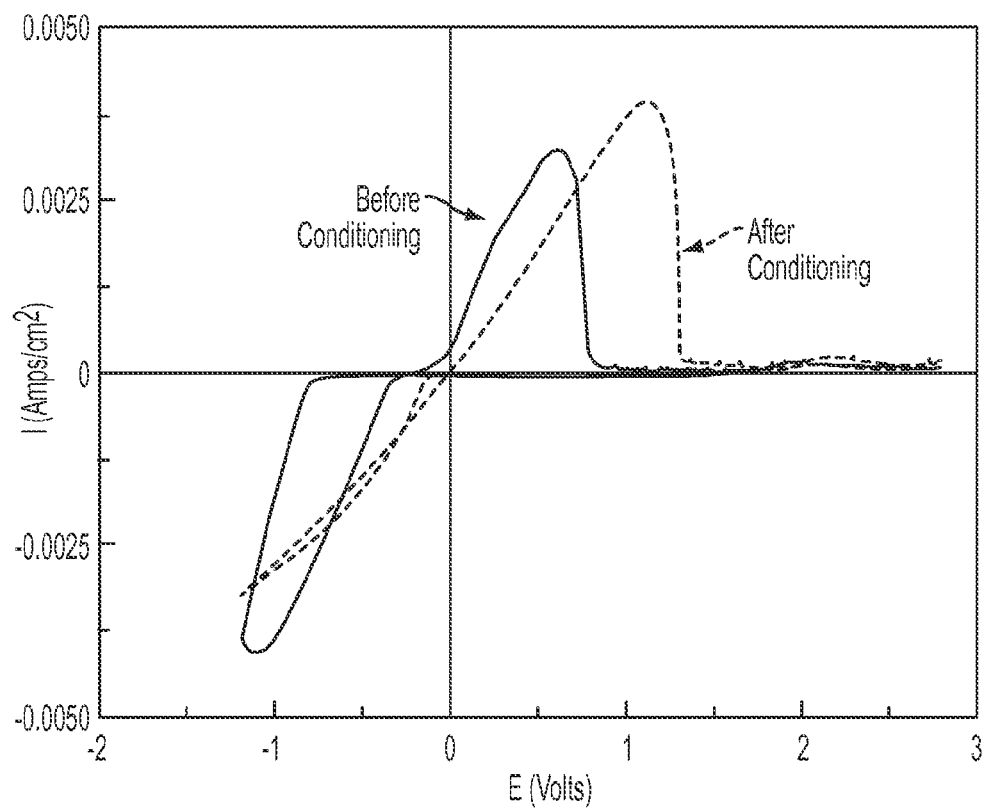
FIG. 3 shows representative cyclic voltammogram of the all-inorganic Magnesium Aluminum Chloride complex dissolved in tetrahydrofuran (THF) using a platinum working electrode, and Mg for the counter and reference electrodes. The voltammogram depicted in black illustrates the significant hysteresis between Mg plating and stripping while the voltammogram depicted in grey depicts the same solution with significantly improved plating ability due to electrochemical conditioning. The experiment utilized 25 mV/s scan rate and a platinum working electrode, and Mg for the counter and reference electrodes.

FIG. 3 depicts representative cyclic voltammogram of the all-inorganic Magnesium Aluminum Chloride complex dissolved in tetrahydrofuran (THF) using a platinum working electrode, and Mg for the counter and reference electrodes. The voltammogram depicted in black illustrates the significant hysteresis between Mg plating and stripping of the as produced solution while the voltammogram depicted in grey depicts the same solution with significantly improved plating ability due to electrochemical conditioning by galvanostatic and/or potentiostatic polarization. The electrolyte solution was potentiostatically polarized within the same voltage window for 15 cycles. The cyclic voltammetry utilized 25 mV/s scan rate and a platinum working electrode, and Mg for the counter and reference electrodes.

EXAMPLE 3

Figure 4:
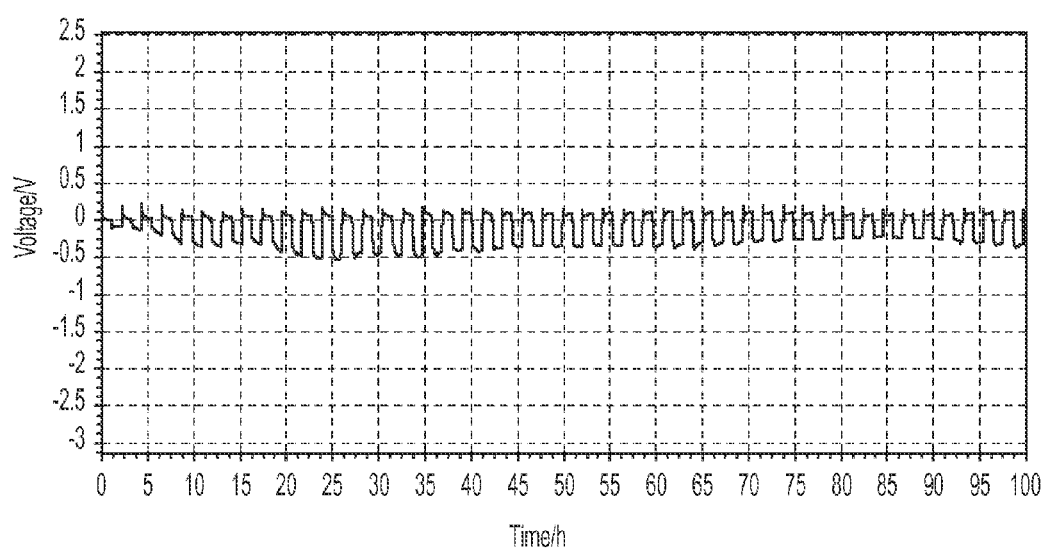
FIG. 4 displays chronopotentiometry of a symmetric cell wherein all electrodes are Mg metal. The data was taken for 100 hours at an applied current of ~0.1 mA/cm².
Figure 5:
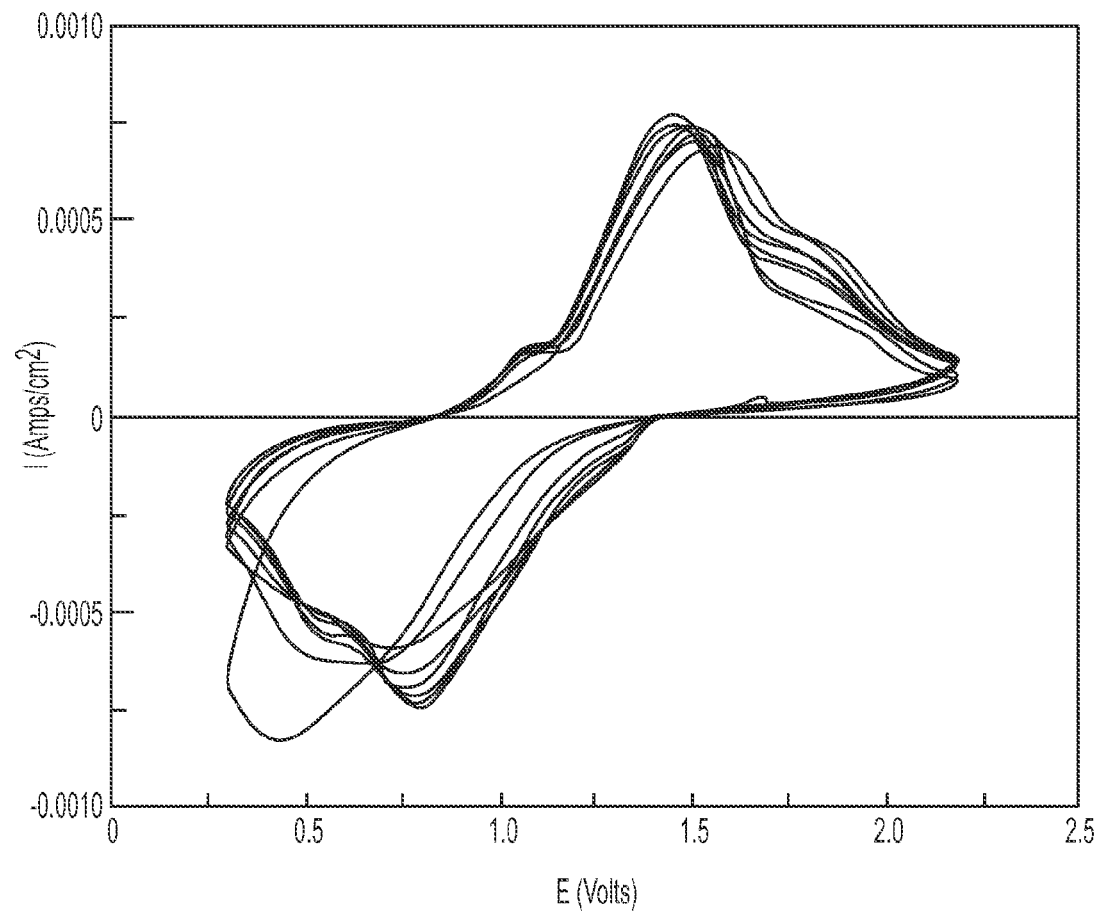
FIG. 5 is a graph of cyclic voltammetry for $Mo_6S_8$ cathode in Magnesium-Aluminum-Chloride Complex solution. This experiment utilizes Mg counter and reference electrode. The current response obtained corresponds to about 80 mAh/g over multiple charge/discharge cycles.

Referring now to FIG. 4, which displays a graph of the potential response of resulting during chronopotentiometry experiments carried out with Mg$_2$AlCl$_2$ complex inorganic salt obtained with THF solution from the reaction of 2MgCl$_2$+1AlCl$_3$. This test utilizes Magnesium electrodes in a symmetric cell fashion and an applied current of 0.1 mA/cm2, which switches polarity every one hour. The overpotential for dissolution is quite small (~0.05 V vs. Mg) throughout the test while the overpotential for deposition varies between −0.1 and −0.5 V vs. Mg metal. The results suggest the overpotential for Mg deposition is at most −0.5 V vs. Mg/Mg$^{2+}$, but that the mean within the 100 hour period is about −0.25 V vs. Mg/Mg$^{2+}$.

EXAMPLE 4

An electrochemical cell was prepared consisting of a Chevrel-phase cathode, a magnesium metal anode, and an electrolyte containing Magnesium Aluminum Chloride complex salt. The cathode was made from a mixture of copper-leached Chevrel-phase material containing 10 weight-% carbon black and 10 weight-% PVdF as a binder, spread on Pt mesh current collector. The electrolyte solution containing Mg$_3$AlCl$_9$, was prepared from the reaction of 3MgCl$_2$+ 1AlCl$_3$ in THF solution. The anode and reference electrode was composed of pure magnesium metal. The glass cell was filled under inert atmosphere. FIG. 4 depicts a graph of the results from cyclic voltammetry carried out on this cell. A scan rate of 0.1 mV/s was applied, so as not to limit the current response by the rate of Mg solid-state diffusion into Chevrel. The current response of the voltammogram corresponds with ~80 mAh/g over eight charge/discharge cycles at voltages comparable to those observed in prior art with organo-Mg complex salt solutions.

The above descriptions are intended only to serve as examples, and that many other embodiments are possible within the spirit and the scope of the present invention.

What is claimed is:

1. A non-aqueous electrolyte solution comprising:
   (a) at least one organic solvent; and
   (b) at least one electrolytically active, soluble, inorganic magnesium (Mg) salt complex represented by the formula Mg$_a$Z$_b$X$_c$, and Z and X are selected such that Z and X forma Lewis Acid; and 1≤a≤10, 1≤b≤5, and 2≤c≤30,
   wherein
      Z is selected from the group consisting of aluminum, boron, phosphorus, titanium, iron, and antimony; and
      X is selected from the group consisting of I, Br, Cl, F and mixtures thereof, and
      wherein the Mg:Z ratio is greater than 1:2.

2. The non-aqueous electrolyte solution of claim 1, wherein a, b, and c are selected to maintain neutral charge of the molecule.

3. The non-aqueous electrolyte solution of claim 1, wherein 1≤a≤10, 1≤b≤2, and 3≤c≤30.

4. The non-aqueous electrolyte solution of claim 1, wherein the magnesium (Mg) salt complex is represented by formula Mg$_n$ZX$_{3+(2*n)}$, wherein n is from 1 to 5.

5. A method of preparing a non-aqueous electrolyte solution of claim 1, comprising:
   combining a source of magnesium, and a source of Z, in an electrolyte solvent.

6. An electrochemical cell, comprising:
   a non-aqueous electrolyte solution according to claim 1;
   a magnesium-containing anode and
   a cathode capable of reversible electrochemical reaction with magnesium.

7. The electrochemical cell of claim 6, wherein the magnesium anode is selected from the group consisting of Mg, Mg alloys, electrodeposited Mg, anatase TiO$_2$, rutile TiO$_2$, Mo$_6$S$_8$, FeS$_2$, TiS$_2$, and MoS$_2$.

8. The electrochemical cell of claim 6, wherein the cathode is selected from the group consisting of Chevrel phase Mo$_6$S$_8$, MnO$_2$, CuS, Cu$_2$S, Ag$_2$S, CrS$_2$, VOPO$_4$, layered TiS$_2$, V$_2$O$_5$, MgVO$_3$, MoS$_2$, MgV$_2$O$_5$, MoO$_3$, spinel CuCr$_2$S$_4$, MgCr$_2$S$_4$, MgMn$_2$O$_4$, MgNiMnO$_4$, Mg$_2$MnO$_4$, NASICON MgFe$_2$(PO$_4$)$_3$ and MgV$_2$(PO$_4$)$_3$, olivine MgMn-SiO$_4$ and MgFe$_2$(PO$_4$)$_2$, tavorite Mg$_{0.5}$VPO$_4$F, TiP$_2$O$_7$, VP$_2$O$_7$, MgMnF$_4$, and FeF$_3$.

9. The non-aqueous electrolyte solution of claim 1, wherein the Mg molarity in the electrolyte solution is at least 0.1 M.

10. The non-aqueous electrolyte solution of claim 1, wherein the at least one organic solvent is one or more solvent selected from the group consisting of ethers, organic carbonates, lactones, ketones, nitriles, ionic liquids, aliphatic and aromatic hydrocarbon solvents and organic nitro solvents.

11. The non-aqueous electrolyte solution of claim 1, wherein the at least one organic solvent is one or more solvent selected from the group consisting of THF, 2-methyl THF, dimethoxyethane, diglyme, ethyl diglyme, butyl diglyme, triglyme, tetraglyme, diethoxyethane, diethylether, proglyme, dimethylsulfoxide, dimethyl sulfite, sulfolane, acetonitrile, hexane, toluene, nitromethane, 1-3 dioxalane, 1-4 dioxane, trimethyl phosphate, tri-ethyl phosphate, hexamethyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), 1-(methoxyethyl)-1-methylpiperidinium-bis(trifluoromethylsulfonyl)imide (MOEMPP-TFSI), and ionic liquids.

12. A non-aqueous magnesium electrolyte solution comprising a complex of an inorganic magnesium halide, wherein the inorganic magnesium halide comprises magnesium chloride, and an inorganic compound more Lewis-acidic than the inorganic magnesium halide in at least one organic solvent.

13. The non-aqueous magnesium electrolyte solution of claim 12, wherein the compound is a Lewis acid.

14. The non-aqueous magnesium electrolyte solution of claim 12, wherein the molar ratio of inorganic magnesium halide to the compound is greater than 1.

15. The non-aqueous electrolyte solution of claim 12, wherein the compound is selected from the group consisting of $BI_3$, $BBr_3$, $BCl_3$, $BF_3$, $AlI_3$, $AlBr_3$, $AlCl_3$, $AlF_3$, $PI_3$, $PBr_3$, $PCl_3$, $PF_3$, $TiI_4$, $TiBr_4$, $TiCl_3$, $TiCl_4$, $TiF_3$, $TiF_4$, $FeI_2$, $FeBr_3$, $FeBr_2$, $FeCl_3$, $FeCl_2$, $FeF_3$, $FeF_2$, $SbI_3$ $SbBr_3$, $SbCl_3$, and $SbF_3$.

16. The non-aqueous electrolyte solution of claim 12, wherein the complex comprises a reaction product of $MgCl_2$ and $AlCl_3$.

17. The non-aqueous electrolyte solution of claim 16, wherein the Mg:Al ratio is in the range of greater than 0.5.

18. The non-aqueous electrolyte solution of claim 12, wherein the Mg molarity in the electrolyte solution is at least 0.1 M.

19. The non-aqueous electrolyte solution of claim 12, wherein the at least one organic solvent is one or more solvent selected from the group consisting of ethers, organic carbonates, lactones, ketones, nitriles, ionic liquids, aliphatic and aromatic hydrocarbon solvents and organic nitro solvents.

20. The non-aqueous electrolyte solution of claim 12, wherein the at least one organic solvent is one or more solvent selected from the group consisting of THF, 2-methyl THF, dimethoxyethane, diglyme, ethyl diglyme, butyl diglyme, triglyme, tetraglyme, diethoxyethane, diethylether, proglyme, dimethylsulfoxide, dimethyl sulfite, sulfolane, acetonitrile, hexane, toluene, nitromethane, 1-3 dioxalane, 1-4 dioxane, trimethyl phosphate, tri-ethyl phosphate, hexamethyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), 1-(methoxyethyl)-1-methylpiperidinium-bis(trifluoromethylsulfonyl)imide (MOEMPP-TFSI), and ionic liquids.

21. The non-aqueous electrolyte solution of claim 12, for use in a magnesium electrochemical cell.

22. The non-aqueous electrolyte solution of claim 12, for use in a magnesium plating bath.

* * * * *